United States Patent [19]

Grant et al.

[11] Patent Number: 4,654,233
[45] Date of Patent: Mar. 31, 1987

[54] RADIATION-CURABLE THERMOPLASTIC COATING

[75] Inventors: Richard J. Grant, Maplewood; Gilbert C. Johnson, Lino Lakes; Heather V. Landin, St. Paul, all of Minn.

[73] Assignee: Minnesota Mining and Manufacturing Company, Saint Paul, Minn.

[21] Appl. No.: 673,873

[22] Filed: Nov. 21, 1984

[51] Int. Cl.$^4$ .................. B05D 3/00; B32B 27/10; C08L 67/06

[52] U.S. Cl. .................. 427/379; 427/386; 428/481; 525/54.21; 525/54.22; 525/54.3; 525/111; 525/112; 525/170; 522/89; 522/102; 522/95

[58] Field of Search .................. 525/54.22, 54.3, 54.21, 525/112, 111; 526/238.21; 523/448; 428/481; 427/379

[56] References Cited

U.S. PATENT DOCUMENTS

| | | |
|---|---|---|
| 2,821,544 | 1/1958 | Holtschmidt et al. ............... 260/486 |
| 3,256,226 | 6/1966 | Fekete et al. ........................ 260/23.5 |
| 3,697,312 | 10/1972 | Johnson .............................. 525/112 |
| 3,749,592 | 7/1973 | Gaske et al. .......................... 117/62 |
| 3,782,950 | 1/1974 | Ranz et al. ............................. 96/85 |
| 3,847,770 | 11/1974 | Radlowe et al. ............... 204/159.23 |
| 4,112,182 | 9/1978 | Newland et al. .................... 428/336 |
| 4,147,603 | 4/1979 | Pacifici et al. .................. 204/159.12 |
| 4,233,425 | 11/1980 | Tefertiller et al. ................... 525/455 |
| 4,309,529 | 1/1982 | Wendling ............................ 528/289 |
| 4,316,952 | 2/1982 | Wendling ............................ 430/285 |
| 4,378,411 | 3/1983 | Heilmann et al. ................... 428/500 |
| 4,407,855 | 10/1983 | Russell .............................. 427/54.1 |
| 4,543,406 | 9/1985 | Otsuki ............................... 528/111.5 |

OTHER PUBLICATIONS

E. Levine, "Formulating Ultraviolet Curable Coatings", Modern Paint and Coatings, Aug. 1983, pp. 26–29.
R. S. Bailey, "UV Cured Coatings for Wood Furniture", Radiation Curing, Nov. 1983, pp. 14–17.
Dow Chemical Company product bulletin, "Developmental Monomer XAS-10743.00, Isocyanatoethyl Methacrylate, C. A. S. No. 030674-80-7".
*Useful Facts and Figures*, 3rd Ed., Technical Publication No. MSB-111-38, Reliance Universal, Inc., Louisville, Ky., pp. 15–18, 69–73.
Delzene, Recent Advances in Photo–Cross–Linkable Polymers, J. Macromol. Sci. Revs. Polym. Technol., D1(2), 185 (1971).

Primary Examiner—Lewis T. Jacobs
Assistant Examiner—Patricia A. Short
Attorney, Agent, or Firm—D. M. Sell; J. A. Smith; C. Truesdale

[57] ABSTRACT

A coating composition is provided. The coating composition is a curable blend of ethylenically unsaturated polyester and ethylenically unsaturated thermoplastic polymers. The composition is capable of providing a thermoplastic, soluble, sandable, intermediate-stage coating and, when cured, a final stage coating which is unaffected by acetone placed on the final stage coating for two hours at 22° C., has a percent haze value of 15% or less, and is unaffected when subjected to a Wet Print Test.

15 Claims, No Drawings

RADIATION-CURABLE THERMOPLASTIC COATING

This invention relates to protective, organic coatings for wood and other substrates. This invention, in another aspect, relates to radiation-curable thermoplastic coating compositions which are, upon application to a substrate as a coating, sandable and repairable, and which can be radiation-cured, and to substrates so prepared.

Protective coatings for wood and various other solid substrates are well known and a wide variety of coating compositions have been used in the past. Some protective coatings serve a number of different purposes such as providing abrasion and scratch resistance and protection against water spotting and solvent damage. Two important types of protective coatings are lacquer-type or reactive-type coatings.

Lacquer-type coating compositions are provided as a solvent solution of solid thermoplastic resins, either naturally occurring resins, e.g., shellac, or synthetic resins, e.g., nitrocellulose. The lacquer-type coating is obtained by coating a substrate with the resin solution and allowing the solvent to evaporate. By using these lacquer-type coating compositions, coatings are obtained that can, in many examples, be sanded, buffed and polished. The coating, even though it may be somewhat abrasion resistant, is still soluble in certain solvents and therefore readily damaged by solvent.

The reactive-type coating compositions are provided as one or more compounds, oligomers or polymers which contain polymerizable or reactive functional groups such as ethylenic unsaturation (e.g., acrylate or methacrylate groups), epoxy, isocyanate, carboxylic acid, and hydroxyl groups, that can react to chain-extend and/or crosslink to form the protective coating. In some cases, the reaction can take days before the coating has achieved the desired hardness or degree of cure. Compositions containing polymerizable ethylenic unsaturation can be cured by heat or radiation, e.g., ultraviolet light or electron beam radiation. Such compositions cured by ultraviolet light require the presence of a photoinitiator, while those cured with electron beam radiation do not require a photoinitiator. Radiation cured coatings often take only seconds or minutes to cure to yield the final desired properties. See for example, E. Levine, "Formulating Ultraviolet Curable Coatings", Modern Paint and Coatings, August 1983, 26–29; R. S. Bailey, "UV Cured Coatings for Wood Furniture", Radiation Curing, November 1983, 14–17; U.S. Pat. Nos. 4,407,855 (Russell) 4,417,603 (Pacifici et al) and 3,749,592 (Gaske, et al).

Such prior art radiation curable coatings, particularly as a topcoat for wood, such as wood furniture and paneling, are useful in providing various degrees of protection against solvents, stains and abrasion, but all suffer from one or more disadvantages. For example, those coatings prepared from blends of ethylenically unsaturated oligomers and monomers are wet or tacky after coating and thus are susceptible to the pickup of dust particles or foreign matter until crosslinked by radiation and the appearance of the coating can be detrimentally affected. After crosslinking, imperfections which may be present in the insoluble, radiation cured, hard coatings are difficult to correct such as by sanding and buffing, and defects cannot be repaired by removal of the coating by solvents.

One class of reactive-type coatings are the ethylenically unsaturated polyesters which can be polymerized under the influence of activating energy. For example, Fekete et al. (U.S. Pat. No. 3,256,226) describe hydroxy polyether polyesters having terminal ethylenic unsaturation which are the reaction product of dicarboxylic acids, ethylenically unsaturated monocarboxylic acids, and diepoxide compounds. Radlowe et al (U.S. Pat. No. 3,847,770) describe beta-hydroxy polyitaconates that are the reaction product of itaconic acid and polyepoxides and which can be copolymerized with polyacrylates. Fekete et al and Radlowe et al, however, do not teach how to use their reaction product to prepare polyesters that have a sufficient number of ethylenically unsaturated groups to be polymerizable to highly abrasion resistant coatings. Wendling (U.S. Pat. No. 4,309,529 and U.S. Pat. No. 4,316,952) does disclose adducts of diepoxide and itaconic acid that do have a sufficient number of ethylenically unsaturated groups to be polymerizable to highly abrasion resistant coatings but because of the hydrophilic nature of the diepoxide that is used, namely a bisepoxy heterocyclic compound, the coatings obtained tend to be hydrophilic and subject to damage by aqueous substances.

Another class of reactive coatings are the urethane polyethers which can be polymerized by actinic radiation and/or chemical initiation. For example, Tefertiller et al (U.S. Pat. No. 4,233,425) describe addition polymerizable polyethers having a polyether backbone and at least one pendant ethylenically unsaturated aliphtic urethane group, such as the reaction product of a polyether polyol and 2-isocyanatoethyl methacrylate. These coatings may be subject to damage by extended contact with some solvents. Dow Chemical Company product bulletin "Developmental Monomer XAS-10743.00, Isocyanatoethyl Methacrylate, C.A.S. Number 030674-80-7" further describes isocyanatoethyl methacrylate.

Other reactive-type coatings include cellulose derivatives, such as hydroxypropyl cellulose, reacted with isocyanatoethyl methacrylate as described in U.S. Pat. No. 3,782,950 (Ranz et al.) and cellulose esters modified with an unsaturated carboxylate moiety as disclosed in U.S. Pat. No. 4,112,182 (Newland et al.). The coatings taught in these patents may not develop the desired solvent resistance or abrasion resistance in the cured coatings.

A further class of polymerizable coatings are those containing polymerizable acrylamidomethyl cellulose esters available from A. E. Staley Mfg. Co. under the trademark Stalink ™. In its product bulletin, distributed at a trade show, "Radcure '84", in Atlanta, GA, during September, 1984, this company describes the acrylamido methyl cellulose esters as cellulose ester

While providing some improvement in solvent resistance and abrasion resistance in cured coatings, some of such coatings were found not to provide the high degree of solvent resistance and abrasion resistance desired for some end-use applications.

In U.S. Pat. No. 3,749,592 (Gaske et al.), coatings based on cellulose derivatives are described which provide an easily workable solid film in solvent-soluble thermoplastic form which can be physically worked for various purposes which are conventional to the lacquer art and which can thereafter be exposed to radiation to cure the film to increase the solvent resistance and physical toughness of the film and thereby produce a more durable film which is difficult to work. However, these coatings generally do not develop sufficient solvent resistance, heat resistance or abrasion resistance in the final photocured coating.

Various major coating resins, including polyesters and cellulosics, are described in *Useful Facts and Figures*, 3rd Ed., Technical publication No. MSB-111-38, Reliance Universal, Inc., Louisville, KY, pp. 15–18.

Other deficiencies in many known protective coatings are darkness of coating color and/or lack of clarity, because the coatings include components which are colored or develop color on curing, or are incompatible, i.e., not mutually soluble, with each other.

The present invention provides protective liquid organic coating compositions for wood and other substrates comprising, a blend of (a) copolymerizable ethylenically unsaturated polyesters, and (b) copolymerizable ethylenically unsaturated, thermoplastic polymers. The compositions provide (1) thermoplastic, soluble, sandable, repairable intermediate stage coatings, and (2) when cured, final stage coatings which are solvent resistant, stain resistant, heat resistant, and abrasion resistant.

This invention also provides protective cured organic coatings which are unaffected by acetone for a period of at least 30 minutes, preferably at least two hours, at 22° C.

This invention further provides a protective cured organic coating having a haze value of 15% or less, haze values being inversely proportional to abrasion resistance. Haze values are measured on a Gardner Hazemeter after subjecting the cured coating surface to 30 cycles on a Taber Abraser using a CS17 wheel with a 500 g load.

The present invention also provides protective cured organic coatings which are unaffected when subjected to a Wet Print Test, a test which measured heat resistance and is described hereinbelow.

The present invention still further provides a method for providing a substrate with a protective coating comprising applying to a substrate a coating composition comprising the above composition, drying the coating composition to remove solvent, and curing the dried coating with activating energy. The dried coating may optionally be sanded, e.g. to smooth or repair the surface, prior to curing.

The invention additionally provides wood surfaces such as those of furniture and paneling having a protective cured coating which is solvent resistant, abrasion resistant, heat resistant, and stain resistant.

The ethylenically unsaturated polyester component (a) of the coating composition of this invention, is the condensation or addition product of a polyhydroxy polyester with an effective amount of polymerizable ethylenically unsaturated compound having sufficient reactive groups to react with the hydroxyl groups of the polyhydroxy polyester to provide the ethylenically unsaturated polyester with an ethylenic unsaturation equivalent weight of preferably less than about 500, more preferably less than 400. The polyhydroxy polyester is preferably the reaction product of an organic diepoxide, a saturated or unsaturated dicarboxylic acid, and, optionally a saturated or unsaturated monocarboxylic acid and/or monoepoxide.

A class of the ethylenically unsaturated polyesters is that represented by the formula:

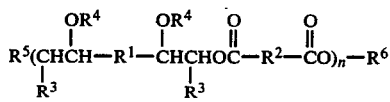

wherein
each $R^1$ and $R^2$ are independently a divalent organic group having 2 to 40 carbon atoms selected from saturated or unsaturated straight or branched aliphatic or cycloaliphatic groups or aromatic groups;

each $R^3$ is independently hydrogen or an alkylene group having 2 or 3 catenary atoms that together with atoms in $R^1$ and the —CH—CH— group can form a 5- or 6-membered trivalent cycloalkane group, each $R^4$ is independently

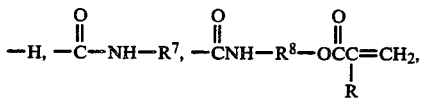

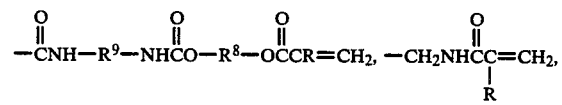

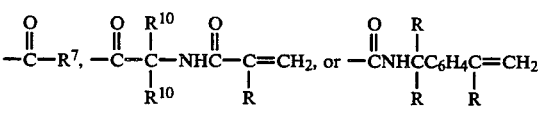

in which R is —H or —CH$_3$; wherein $R^7$ is a monovalent organic radical having 1 to 24 carbon atoms and is selected from saturated or unsaturated straight or branched aliphatic groups or aromatic groups; $R^8$ is an alkylene group having 2 to 12 carbon atoms; $R^9$ is a divalent organic group selected from linear, branched, and cyclic alkylene groups having 2 to 40 carbon atoms, phenylene groups, naphthylene groups, and phenylenemethylenephenylene groups, the organic group being optionally substituted by up to four lower alkyl groups having 1 to 4 carbon atoms; and $R^{10}$ is hydrogen or an alkyl group having 1 to 4 carbon atoms;

$R^5$ is selected from

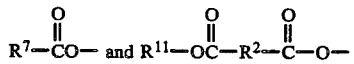

where $R^2$ and $R^7$ are as defined above and $R^{11}$ is selected from hydrogen,

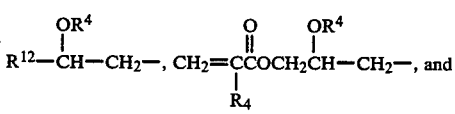

-continued

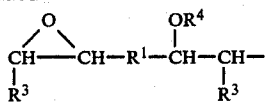

where $R^1$, $R^3$, and $R^4$ are as defined above and $R^{12}$ is a monovalent organic radical having 1 to 20 carbon atoms and is selected from saturated and unsaturated straight or branched chain aliphatic groups or aromatic groups;

$R^6$ is selected from $R^{11}$ and

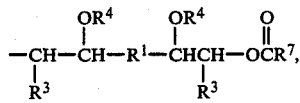

where $R^1$, $R^3$, $R^4$, $R^7$ and $R^{11}$ are as defined above; and n is a number having an average value of about 1 to 10, preferably about 1 to 5, except that where $R^5$ is

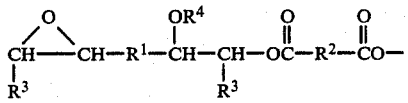

and $R^6$ is selected from hydrogen,

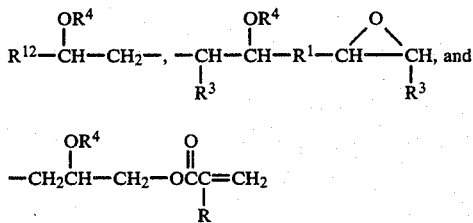

then n is a number having an average value of about 0 to 10, preferably about 0 to 5. $R^2$, $R^4$, $R^5$ and $R^6$ preferably contain ethylenic unsaturation sufficient to provide an ethylenic unsaturation equivalent wieght of less than about 500.

A preferred subclass of ethylenically unsaturated polyesters are those represented by the formula where $R^1$, $R^2$, $R^3$, $R^4$, and $R^7$ are as defined above and n is a number having an average value of 1 to 10, preferably 1 to 5. $R^2$, $R^4$, and $R^7$ preferably each contain a polymerizable ethylenically unsaturated group.

The above polyester represented by formula I can be prepared in two steps by first reacting a diepoxide with a dicarboxylic acid, and, optionally, a monocarboxylic acid and/or a monoepoxide, in appropriate molar ratios to yield a polyhydroxy polyester intermediate, which intermediate is then reacted with a polymerizable ethylenically unsaturated compound possessing a hydroxyl-reactive functional group, such as an isocyanato group, to yield the ethylenically unsaturated polyester represented by formula I above.

The preferred subclass of ethylenically unsaturated polyesters can be prepared by reacting a diepoxide with a dicarboxylic acid and a monocarboxylic acid in appropriate molar ratios to yield a polyhydroxy polyester intermediate which is then reacted with a polymerizable ethylenically unsaturated compound possessing a hydroxylreactive functional group to yield the ethylenically unsaturated polyester represented by formula II.

In the first step, the reaction can be performed in the presence of an esterification catalyst, preferably a chromic ion or tertiary amine catalyst, a solvent, and an inhibitor for thermal polymerization of ethylenically unsaturated group-containing compounds, by heating the reaction mixture at a temperature from 50° to 150° C., preferably about 70° to 100°, until the disappearance of the epoxide group, as may be determined by chemical titration. Heating for 2 to 40 hours usually suffices to complete the reaction.

In the second step the polyhydroxy polyester of the first step is reacted with a polymerizable ethylenically unsaturated compound having a functional group reactive with the hydroxyl groups of the hydroxy polyester.

The preparation of the ethylenically unsaturated polyester is illustrated in the following reaction schemes, where R, $R^1$ through $R^9$, and n are as defined above for general formulas I and II. Scheme 1 illustrates the preparation of a polyhydroxy polyester intermediate I' and scheme 2 shows the preparation of a polyester within the class represented by of formula I by reaction with a hydroxyl-reactive unsaturated compound. Scheme 3 illustrates the preparation of a polyhydroxy polyester intermediate II', and schemes 4, 5 and 6 show the preparation of various examples of polyester of formula II from II' by reaction with hydroxyl-reactive, unsaturated compounds.

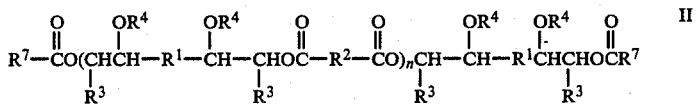

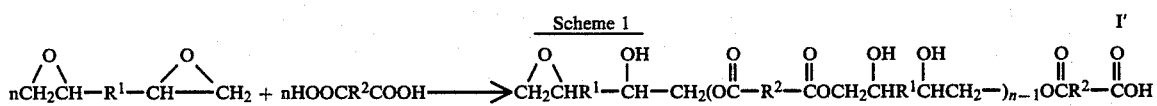

Scheme 1

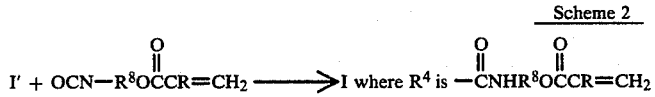

Scheme 2

Scheme 3

In the above schemes and formulas I and II, the oxirane rings of the diepoxide are shown as opening with the oxygen atom attached to the beta carbon. However, some oxirane rings may open such that the oxygen is attached at the alpha carbon.

Scheme 4

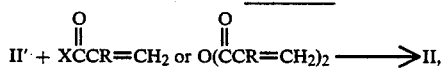

where $R^4$ is $-\overset{O}{\overset{\|}{C}}CR=CH_2$ and X is halogen or OH

Scheme 5

where $R^4$ is $-\overset{O}{\overset{\|}{C}}NH-R^8-\overset{O}{\overset{\|}{O}}CCR=CH_2$ Scheme 6

where $R^4$ is $-\overset{O}{\overset{\|}{C}}NH-R^9-NH\overset{O}{\overset{\|}{C}}O-R^8-\overset{O}{\overset{\|}{O}}CCR=CH_2$ In the first step, the reaction generally can be performed in the presence of a solvent for the reactants and an inhibitor for thermal polymerization of ethylenically unsaturated group-containing compounds by heating the reaction mixture at a temperature from 50° to 150° C., preferably about 70° to 100° C. Heating for from 2 to 40 hours usually suffices to complete the reaction.

Diepoxides

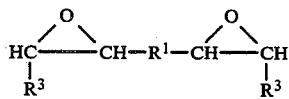

that can be used in preparing the ethylenically unsaturated polyester oligomer of the invention are branched or straight chain aliphatic, cycloaliphatic, or aromatic compounds having two oxirane groups and a molecular weight of up to about 400. The divalent organic radical $R^1$ can be substituted with non-interfering groups and can contain catenary

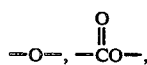

or $SO_2$ and preferably no heterocyclic groups are present.

Representative diepoxides include the following commercially available products: diglycidyl ether of bisphenol A (e.g., Epon TM 828, Shell Chemical Co., and DER TM 332, Dow Chemical Co.); poly(glycidyl bisphenol) (e.g. Epon TM 1002, Shell Chemical Co.); vinylcyclohexene dioxide (e.g., ERL TM -4026, Union Carbide Corp.); 3,4-epoxycyclohexylmethyl 3,4epoxycyclohexane carboxylate (e.g., ERL TM -4221); 3,4-epoxy-6-methylcyclohexylmethyl-3,4-epoxy-6-methyl-cyclohexanecarboxylate (e.g., ERL TM -4201); bis(3,4-epoxy-6-methylcyclohexylmethyl)adipate (e.g., ERL TM -4289); aliphatic epoxy modified with polypropylene glycol (e.g., ERL TM -4050 and ERL TM -4052); dipentene dioxide (e.g., ERL TM -4269 and Oxiron TM 2001, FMC Corp.); and mixtures thereof. Particularly preferred is the diglycidyl ether of Bisphenol A.

Dicarboxylic acids which can be used in the preparation of component (a) of this invention can be saturated or unsaturated, aliphatic, cycloaliphatic, or aromatic and can be substituted optionally by non-interfering groups such as saturated alkyl, unsaturated alkyl, heterocyclic, sulfonate, ester, ether, halohydrocarbon, amide, and carbamate groups. Representative dicarboxylic acids include succinic, glutaric, adipic, suberic, sebacic, maleic, fumaric, itaconic, undecanedicarboxylic, hexadecanedicarboxylic, diglycolic, dilactic, 3,3'-(ethylenedioxy)dipropionic, phthalic, isophthalic, terephthalic, phenylenediacetic, benzylsuccinic, 1,4-naphthalenedicarboxylic, 5-chloro-1,3-benzenedicarboxylic, tetrachlorophthalic, 1,2-cyclohexanedicarboxylic, 2,4-pyridinedicarboxylic, 2,5-tetrahydrofurandicarboxylic, 1,5-pent-2-enedioic, 2-methyleneglutaric, 2-methyleneadipic, 2-methylitaconic, and 2,2-dimethylitaconic, and mixtures thereof. The preferred dicarboxylic acids are the alpha methylene dicarboxylic acids, particularly itaconic acid.

Monocarboxylic acids which can be optionally used to prepare component (a) of this invention may be saturated or unsaturated, aliphatic, cycloaliphatic, or aromatic and may be substituted optionally by non-interfering groups such as saturated and unsaturated alkyl, heterocyclic, sulfonate, ester, ether, halohydrocarbon, amide, and carbonate groups. Representative mono-carboxylic acids include the following: acetic, propionic, butyric, valeric, hexanoic, octanoic, undecanoic, hexadecanoic, acrylic, methacrylic, crotonic, 2-butenoic, 3-hexenoic, undecylenic, oleic, benzoic, phenylacetic, 4-chlorobenzoic, 4-trifluoromethylbenzoic, and 4-methoxycarbonylbenzoic and mixtures thereof. Preferred monocarboxylic acids are the alpha, beta unsaturated carboxylic acids, particularly acrylic and methacrylic.

Monoepoxides that can be optionally used in the practice of this invention have the formula

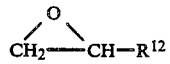

wherein $R^{12}$ is as defined above. The monoepoxides can be saturated or unsaturated aliphatic, cycloaliphatic, or aromatic and can be substituted with noninterfering groups and can contain catenary -O-,

or SO$_2$. Examples include glycidyl ethers of monohydric alcohols, glycidyl esters of monocarboxylic acids or olefin monoepoxides, including the glycidyl esters of acrylic and methacrylic acid, the glycidyl ether of butanol, and styrene oxide.

Polymerizable ethylenically unsaturated compounds having hydroxyl-reactive functional groups which can be used to prepare the ethylenically unsaturated polyester component (a) of this invention, such as in preparative reactions illustrated in general schemes 2, 4, 5 and 6 above, contain hydroxyl-reactive functional groups such as carboxylic acid, carboxylic acid chloride, carboxylic acid anhydride, and isocyanate. Representative compounds include acrylic acid, methacrylic acid, crotonic acid, acryloyl chloride, methacrylol chloride, crotonyl chloride, acrylic anhydride, methacrylic anhydride, crotonic anhydride, maleic anhydride, 2-isocyanatoethyl acrylate, 3-isocyanatopropyl acrylate, 2-isocyanatoethyl methacrylate, 3-isocyanotopropyl methacrylate, and benzene, 1-(1-isocyanato-1-methylethyl)-3-(1-methylethenyl). Additionally, the polymerizable ethylenically unsaturated adducts can be used, which adducts are prepared from one mole of monohydroxy-substituted acrylates or methacrylates and one mole of a diisocyanate, e.g., 2-[(4-isocyanatophenyl)aminocarbonyloxy] ethyl acrylate and methacrylate, 2-(5-isocyanato-1,3,3-trimethylcyclohexylmethylaminocarbonyloxy)ethyl acrylate and methacrylate, 2-(6-isocyanatohexylaminocarbonyloxy)ethyl acrylate and methacrylate, and 2[(3-isocyanato-4-methylphenyl)aminocarbonyloxy]ethyl acrylate and methacrylate, and mixtures thereof.

Other useful polymerizable ethylenically unsaturated compounds which can be reacted with polyhydroxy polyesters to yield polyethylenically unsaturated polyesters include N-methylol acrylamide, N-alkoxymethyl acrylamide, and ethylenically unsaturated azlactones, examples of which are 2-ethenyl-1,3-oxazolin-5-one, 2-ethenyl-4,4-dimethyl-1,3-oxazolin-5-one, 2-isopropenyl-4-methyl-4-dodecyl-1,3-oxazolin-5-one, and 2-isopropenyl-4,4-dimethyl-1,3-oxazolin-5-one.

Optionally, the polyhydroxy polyester can be reacted with a non-ethylenically unsaturated compound having a functional group reactive with the hydroxyl group of the polyhydroxy polyester. This further substitution can alter the solubility or compatibility of the unsaturated polyester. Examples of non-ethylenically unsaturated compounds include isocyanates such as butyl isocyanate, octadecyl isocyanate, phenyl isocyanates, acid halides and anhydrides such as benzoyl chloride, oleyl chloride, butyryl anhydride, succinic anhydride, and para-toluene sulfonyl chloride.

Since the ethylenically unsaturated polyester composition is preferably used in a coating composition, the solvents used preferably have a boiling point at atmospheric pressure of less than about 200° C. so that the solvents are readily volatilized from a coating of the composition, and have a boiling point of at least 50° C. so that the temperature at which the polyhydroxy polyester and the ethylenically unsaturated polyester are prepared can be at least 50° C. without the use of pressure equipment. The preparation reactions can be carried out in pressure equipment, if desired, under pressures of several atmospheres or more. Most solvents having an atmospheric boiling point within the range of 50° C. to 200° C. can be used provided they do not have interfering groups, i.e., hydroxyl groups, which would interfere by reaction with an epoxy group. It is preferred that solvents be selected from esters, ketones, or aromatic hydrocarbons such as butyl acetate, cellosolve acetate, methyl isobutyl ketone, and xylene. Generally, in the first step of the reaction, the amount of solvent used results in a solution containing up to 100 percent reactive material, preferably 50 to 80 percent solids, the higher solids content used where the molecular weight of the resulting polyhydroxy polyester is low, and in the second step the amount of solvent used results in a solution containing up to 80 percent reactive material, preferably 50 to 70 percent reactive material.

Use of thermal inhibitors in compositions containing polymerizable ethylenically unsaturated groups is well known and such inhibitors are used in amounts up to about 0.02 percent by weight of the composition exclusive of solvents. Examples of useful thermal inhibitors are quinone and naphthoquinone. Generally, there is present in the commercially obtained ethylenically unsaturated compounds sufficient inhibitor to prevent thermal polymerization during synthesis.

Polymerizable ethylenically unsaturated thermoplastic polymers, useful as component (b) of the coating composition of this invention, and copolymerizable with component (a), include polymers and copolymers of ethylenically unsaturated cellulose esters, ethylenically unsaturated polyvinyl acetate copolymers, e.g., copolymers prepared from partially hydrolysed polvinyl acetate reacted with polymerizable ethylenically unsaturated compounds containing a hydroxyl-reactive functional group such as acrylic acid, acryloyl chloride and the like, and ethylenically unsaturated acrylic copolymers, e.g. copolymers prepared from hydroxyethyl acrylate/alkyl acrylate copolymers reacted with acryloyl chloride, glycidyl methacrylate/alkyl acrylate copolymers reacted with acrylic acid, or acrylic acid/alkyl acrylate copolymers reacted with glycidyl methacrylate, and the above glycidyl methacrylate/alkyl acrylate/acrylic acid copolymer and acrylic acid/alkyl acrylate/glycidyl methacrylate copolymer further reacted with polymerizable ethylenically unsaturated hydroxyl-reactive compounds. Other useful polymerizable ethylenically unsaturated thermoplastic polymers are copolymers prepared from vinyl azlactone and hydroxyalkyl acrylates as disclosed in U.S. Pat. No. 4,378,411, which is incorporated herein by reference. Additional polymerizable ethylenically unsaturated thermoplastic polymers are disclosed in Delzene, Recent Advances in Photo-Cross-Linkable Polymers, J. Macromol. Sci. Revs. Polym. Technol., D1(2), 185 (1971).

The preferred polymerizable ethylenically unsaturated thermoplastic polymers are ethylenically unsaturated thermoplastic cellulose esters. These thermoplastic cellulose esters are the condensation or addition product of a cellulose ester of cellulose and C$_2$ to C$_4$ saturated aliphatic acids or aromatic acids, e.g., benzoic acid, this cellulose ester having an average of 0.1 to 2.0, preferably 0.25 to 1.0, unreacted hydroxyl groups per anhydroglucose unit (AGU),

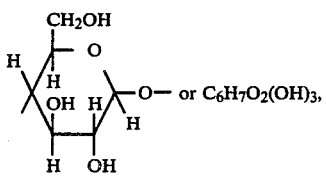 or $C_6H_7O_2(OH)_3$, with
about 30 to 100 percent of the stoichiometric amount of polymerizable ethylenically unsaturated compound having a functional group reactive with the unreacted hydroxyl groups of the cellulose ester,
to yield an ethylenically unsaturated cellulose ester wherein about 30 to 100 percent, preferably 70 to 100 percent, of the free hydroxyl groups have been converted to polymerizable unsaturated groups.

A class of the polymerizable ethylenically unsaturated cellulose esters, can be represented by the following formula:

$$[C_6H_7O_2(OR^{13})_x(OR^{14})_{3-x}]_m \qquad III$$

wherein each $R^{13}$ is independently selected from H,

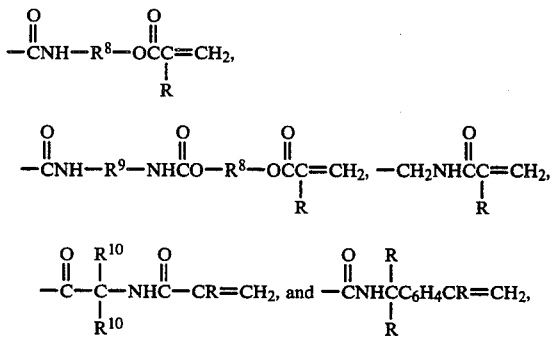

where R, $R^8$, $R^9$, and $R^{10}$ are as defined above; $R^{14}$ is selected from

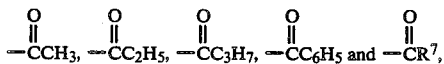

$R^7$ is as defined above; x is 0.1 to 2.0; m is a number of at least about 20 or larger, and the various $OR^{13}$ and $OR^{14}$ groups are randomly distributed in the m subunits, i.e., substituted anhydroglucose units, of the cellulose ester. These ethylenically unsaturated cellulose esters preferably have an unsaturated equivalent weight of less than about 1000, more preferably less than about 500.

A preferred subclass of formula III is

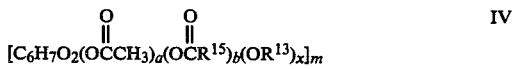

where $R^{15}$ is independently selected from $-C_2H_5$ and $-C_3H_7$, $R^{13}$, m and x are as defined for formula III, and the sum of a and b is $3-x$, each of a and b are 0 to 2.9 and the a, b and x groups are randomly distributed in the m subunits of the cellulose ester.

The preferred hydroxyl group-containing cellulose ester starting materials for conversion to the polymerizable ethylenically unsaturated cellulose esters are cellulose acetate (CA), cellulose acetate propionate (CAP) and cellulose acetate butyrate (CAB). They are available in various molecular weights (generally characterized by solution viscosities) and various degrees of substitution with respect to acetate, propionate, butyrate and residual or unreacted hydroxyl groups. Particularly useful CAP and CAB cellulose ester resins include CAP-504-0.2, CAP-482-0.5, CAB-551-0.1, CAB-553-0.4, and CAB-381-0.5 resins commercially available from Eastman Chemical Products, Inc.

Representative polymerizable ethylenically unsaturated compounds having hydroxyl-reactive functional groups which can be used to prepare the ethylenically unsaturated cellulose ester by reaction with hydroxyl-containing cellulose esters, e.g., CAP and CAB, include the same classes of reagents used to prepare polyester component (a) by reaction with hydroxyl-containing polyester, examples of said reagents being listed above. Preferred reagents for this purpose are acryloyl chloride, $CH_2=CHCOCl$, methacryloyl chloride, $CH=C(CH_3)COCl$, and isocyanatoethyl methacrylate, $OCNC_2H_4OCOC(CH_3)=CH_2$.

The reaction of the residual hydroxyl groups of the CA, CAP, and CAB resins with hydroxyl-reactive polymerizable unsaturated reagents is carried out in solvents such as esters, ketones, chlorinated solvents and ethers at a resin concentration of about 15–45 weight percent, depending on solution viscosity. If acid chlorides are used as the unsaturated reagent, an acid scavenger such as pyridine or triethylamine is used. The by-product salt, e.g., triethylamine hydrochloride, which forms in the latter reaction is a solid which is insoluble in the reaction solvent and can be removed, for example, by filtration.

The relative amounts of component (a) ethylenically unsaturated polyester and component (b) ethylenically unsaturated thermoplastic polymers which are used to prepare the coating compositions of this invention ranges from about 20 to 80 weight percent, preferably 35 to 50 weight percent, of component (a) and 20 to 80 weight percent, preferably 50 to 65 weight percent, of component (b).

Polymerization initiators (c) are generally required as part of the radiation curable compositions of this invention comprising components (a) and (b), except when curing is carried out by electron beam irradiation. Polymerization initiators, component (c), suitable for use in the cross-linkable compositions of the invention are those compounds which liberate or generate a free-radical on addition of energy. Such catalysts include peroxy, azo, and redox systems all of which are well known and are described frequently in polymerization art. Included among free-radical catalysts are the conventional heat activated catalysts such as organic peroxides and organic hydroperoxides; examples are benzoyl peroxide, tertiary-butyl perbenzoate, cumene hydroperoxide, azo-bis(isobutyronitrile) and the like. The preferred catalysts are photopolymerization initiators which facilitate polymerization when the composition is irradiated. Included among such initiators are acyloin and derivatives thereof, such as benzoin, benzoin methyl ether, benzoin ethyl ether, benzoin isopropyl ether, benzoin isobutyl ether, and 2-hydroxy-2-methyl-1,2-diphenylethanone; diketones such as benzil and diacetyl; phenones such as acetophenone, 2,2,2-tribromo-1-phenylethanone, 2,2-diethoxyacetophenone, 2,2-dimethoxy-2-phenylacetophenone, 2,2,2-tribromo-1-(2-nitrophenyl)ethanone, benzophenone, 4,4'-bis(dimethylamino)benzophenone and 1-hydroxycyclohexylphenyl ketone. Normally, the initiator is used in amounts ranging from about 0.01 to 10% by weight of the total polymerization composition comprising polyester oligomer component (a) and thermoplastic polymer component (b). When the quantity is less than 0.01% by weight, the polymerization rate becomes extremely low. If the initiator is used in excess of about 10% by weight, no correspondingly improved affect can be expected. Thus, addition of such greater quantity is not economically justified and may detract from the properties of the cured coatings. Preferably, about 0.25 to 5% of initiator is used in the polymerizable composition.

The photopolymerization of the compositions of the invention occurs on exposure of the compositions to any source of radiation emitting actinic radiation at a wavelength within the ultraviolet and visible spectral regions and by infrared radiation, i.e. thermal energy. Suitable sources of radiation include mercury, xenon, carbon arc and tungsten filament lamps, sunlight. Exposures may be from less than about one second to ten minutes or more depending upon the amounts of particular polymerizable materials, the photopolymerization catalyst being utilized, the radiation source, the distance of the composition from the source and the thickness of the coating to be cured. The compositions may also be polymerized by exposure to electron beam irradiation. Generally speaking, the dosage necessary is from less than 1 megarad to 30 megarads or more. An advantage of curing with electron beam irradiation is that highly pigmented compositions can be effectively cured at a faster rate than by mere exposure to actinic radiation.

The radiation curable compositions of this invention comprising components (a) and (b) and optional polymerization initiator (c) can be formulated with polymerizable ethylenically unsaturated modifying monomers to modify or enhance the properties of the coatings, e.g., hardness, flexibility, and adhesion. Such monomers may also be used as reactive diluents. Suitable ethylenically unsaturated monomers which can be used include methyl methacrylate, ethyl acrylate, 2-ethylhexyl acrylate, chlorohexyl acrylate, styrene, 2-chlorostyrene, 2,4-dichlorostyrene, acrylic acid, acrylamide, acrylonitrile, t-butyl acrylate, methyl acrylate, butyl acrylate, 2-(N-ethylcarbamyl)ethyl methacrylate. Other diluting monomers that can be incorporated into the composition of the invention include 1,4-butylene diacrylate or dimethacrylate, ethylene glycol diacrylate or dimethacrylate, hexanediol diacrylate or dimethacrylate, glyceryl diacrylate or dimethacrylate, glyceryl triacrylate or trimethacrylate, pentaerythritol triacrylate or trimethacrylate, diallyl phthalate, dipentaerythritol pentaacrylate, neopentylglycol diacrylate, 1,3,5-tri(2-methacryloyloxyethyl)-s-triazine. Generally, up to about 20 percent by weight of modifying monomers per part by weight of blends of compositions (a) and (b) can be used.

In addition to the reactive monomers described above, other modifying polymerizable ethylenically unsaturated coreactants can be used in the radiation curable compositions of this invention, such coreactants including acrylated epoxy and acrylated urethane oligomers and resins. Also, small amounts of non-reactive film-forming resins such as nitrocellulose can be included. The compositions of the invention can also include (besides the monomers, oligomers, and resins mentioned above) a variety of additives utilized for their known purposes, such as stabilizers, inhibitors, lubricants, flexibilizers, pigments, dyes, fillers such as finely divided silica, diatomaceous earth, metal oxides, fiberglass, glass bubbles, and talc. Fillers can generally be used in proportions up to about 200 percent by weight of the curable composition but preferably are used up to about 50 percent by weight. It is desirable that the above optional additives be transparent to the radiation.

Coating formulations of this invention comprising polyester component (a), thermoplastic polymers component (b) and, when required, polymerization initiator (c), and other optional additives, are generally prepared by simple mixing, in the desired proportions, organic solvent solutions of (a) and (b), with addition of (c) if required, and other optional ingredients. The solvents used are usually the solvents in which the polyester component (a) and thermoplastic polymer component (b) were prepared, e.g. methyl ethyl ketone, propyl acetate, although other solvents may be used as well, e.g., by removing and replacing reaction solvents, or by adding additional solvents of choice. If reactive diluting monomers are used, solvents may not be required. The actual choice of solvents, and whether any solvent is required, will usually depend on the coating method.

Coating of the radiation curable compositions of this invention on various substrates can be carried out by known procedures such as conventional spraying, electrostatic spraying, dipping, brushing, roller coating, curtain coating and the like. Substrates which can be coated include plastics, metals, ceramics and wood. The cured crosslinked or insoluble coatings of this invention are particularly valuable as a coating for finished wood articles, e.g., furniture and paneling, to impart solvent, stain and abrasion resistance thereto.

After coating, the solvent, if present, is allowed to evaporate, with added heat and the use of a force air stream where necessary, until the coating is dry to form an intermediate coating. Additional intermediate coatings may be applied if desired to increase coating thickness. At this point, in the case of a coated finished wood article, the solid, intermediate stage coated surface can be repaired, if necessary, i.e. the coating may be removed with solvent and the article recoated, or it can be sanded, buffed and polished to achieve the desired appearance. (See *Useful Facts and Figures,* supra, pp 69–73.)

Curing of the intermediate stage coating to achieve final properties of solvent, stain and abrasion resistance is generally carried out by exposure to ultraviolet radiation, e.g., exposure to 80 watt/cm medium pressure mercury lamps, generally by passing the coated article on a conveyor belt under the lamps one or more times.

The following specific, but nonlimiting examples will serve to illustrate the present invention.

EXAMPLE 1

This example describes the preparation of an ethylenically unsaturated polyester oligomer, component (a) of the radiation curable compositions of this invention.

To a 2 L flask fitted with an electric heating mantle, mechanical stirrer, thermometer, reflux condenser and gas inlet tube was charged 350 g (1.0 mole) diglycidyl ether of Bisphenol A (DER 332, Dow Chemical Co.), 65 g (0.5 mole) itaconic acid, 72 g (1.0 mole) acrylic acid, 325 g butyl acetate solvent and 1.0 ml an organic-soluble chromium salt catalyst (AMC-2, Cordova Chemical Co.). A flow of dry air (about 5 ml per minute) was established and the reaction mixture was heated to 80° C. and stirred for 16 hours. Titration of small samples of the reaction mixture for epoxy and acid content, respectively, indicated essentially complete reaction to yield the hydroxy group-containing polyester oligomer intermediate (see formula II', Scheme 3).

To the above stirred solution was added 279.3 g (1.8 moles) of isocyanatoethyl methacrylate, 186 g additional butyl acetate solvent and 0.34 ml dibutyltin dilaurate catalyst. The reaction mixture was heated and stirred, while maintaining a slow dry air flow through the solution, for 16 hours at 70° C., and allowed to cool to room temperature. Infrared analysis of a small sample of the reaction solution showed no isocyanato groups remaining and indicated complete reaction to yield the desired ethylenically unsaturated polyester oligomer product, in which 90% of the hydroxyl groups have been converted to urethane-methacrylate groups, $$CH_2=CHCOCH_2CH-R^1-CHCH_2OCR^2COCH_2CH-R^1-CHCH_2OCCH=CH_2$$
(with OR⁴ substituents and carbonyl groups as shown)

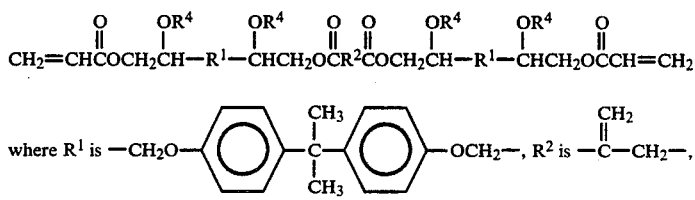

and $R^4$ is selected from

(90%) and H (10%). The calculated molecular weight is 1532 and the calculated ethylenic unsaturation equivalent weight is 232.

EXAMPLE 2

An ethylenically unsaturated polyester oligomer was prepared following the procedure described in Example 1, using 140 g (0.4 mole) diglycidyl ether of Bisphenol A, 35.4 g (0.3 mole) succinic acid, 14.4 g (0.2 mole) acrylic acid, and 74.4 g (0.48 mole) 2-isocyanatoethyl methacrylate, the amount of 2-isocyanatoethyl methacrylate being 60 percent of the theoretical amount needed to react with available hydroxyl groups. The resulting oligomer had a calculated molecular weight of 2642 and an ethylenic unsaturation equivalent weight of 389.

EXAMPLE 3

An ethylenically unsaturated polyester oligomer was prepared following the procedure described in Example 1, using 70 g (0.2 mole) diglycidyl ether of Bisphenol A, 13.0 g (0.1 mole) itaconic acid, 14.4 g (0.2 mole) acrylic acid, and 18.6 g (0.12 mole) 2-isocyanatoethyl methacrylate, the amount of 2-isocyanatoethyl methacrylate being 30 percent of the theoretical amount needed to react with available hydroxyl groups. The resulting oligomer had a calculated molecular weight of 1160 and an ethylenic unsaturation equivalent weight of 276.

EXAMPLE 4

An ethylenically unsaturated polyester oligomer was prepared following the procedure described in Example 1, using 70 g (0.2 mole) diglycidyl ether of Bisphenol A, 16.6 g (0.1 mole) phthalic acid, 14.4 g (0.2 mole) acrylic acid, and 55.8 g (0.36 mole) 2-isocyanatoethyl methacrylate, the amount of 2-isocyanatoethyl methacrylate being 90 percent of the theoretical amount needed to react with available hydroxyl groups. The resulting oligomer had a calculated molecular weight of 1568 and an ethylenic unsaturation equivalent weight of 280.

EXAMPLE 5

An ethylenically unsaturated polyester oligomer was prepared following the procedure described in Example 1, using 70.0 g (0.2 mole) diglycidyl ether of Bisphenol A, 13.0 g (0.1 mole) itaconic acid, 12.0 g (0.2 mole) acetic acid, and 55.8 g (0.36 mole) 2-isocyanatoethyl methacrylate, the amount of 2-isocyanatoethyl methacrylate being 90 percent of the theoretical amount needed to react with available hydroxyl groups. The resulting oligomer had a calculated molecular weight of 1508 and an ethylenic unsaturation equivalent weight of 328.

EXAMPLE 6

This and the following three examples describe the preparation of ethylenically unsaturated cellulose esters, useful as component (b) of the radiation curable compositions of this invention.

To a 1000 ml flask fitted with mechanical stirrer, thermometer, reflux condenser and dropping funnel was added 230 g of anhydrous methyl ethyl ketone solvent. The solvent was heated to 50° C. and 50 g (0.15 equivalent based on hydroxyl content) of previously dried cellulose acetate propionate (CAP-504-0.2, Eastman Chemical Products, Inc.), containing 41% propionyl, 3% acetyl and 5.1% hydroxyl groups, having a hydroxyl equivalent weight of 333 and a falling ball viscosity of 0.2 seconds (ASTM Method D-1343), was added slowly with stirring under a dry air atmosphere. After a homogeneous solution was obtained after about 30 minutes, the flask contents were cooled to 20° C. and 15.1 g (0.15 mole) of triethylamine and 50 mg of the monomethyl ether of hydroquinone polymerization inhibitor were added. A solution of acryloyl chloride (13.6 g, 0.15 mole, in 50 ml of methyl ethyl ketone) was then added over 30 minutes. A white precipitate began to form immediately and the reaction temperature rose to 30° C. The reaction mixture was stirred at room temperature overnight, the viscous slurry was diluted with 250 ml of ethyl acetate, filtered by suction through a bed of diatomaceous earth, and the resulting clear filtrate concentrated in a rotary evaporator under water aspirator vacuum to yield a pale yellow solution containing about 40 weight percent of cellulose acetate propionate acrylate product having a calculated ethylenic unsaturation equivalent weight of 387.

EXAMPLE 7

To a dry one quart, narrow mouth, glass bottle was charged 458 g of a 40 weight percent solution of cellulose acetate butyrate (CAB-553-0.4 containing 47% butyryl, 2% acetyl, and 4.3% hydroxyl groups, 0.46 equivalent based on hydroxyl groups) in anhydrous methyl ethyl ketone, followed by 134.5 g (0.35 mole) of a 40 weight percent solution of isocyanatoethyl methacrylate in methyl ethyl ketone, 60 mg of the monomethyl ether of hydroquinone and 120 mg of dibutyltin dilaurate. The bottle was purged with dry air, sealed, and placed in a water bath for heating and agitation, using a "Launder-O-Meter" for this purpose. After heating at 70° C. for 16 hours, the bottle was removed from the water bath and cooled to room temperature. Infrared analysis of a small sample of the reaction solution showed no unreacted isocyanate groups present, indicating completion of the hydroxyl/isocyanatoethyl methacrylate reaction and preparation of cellulose acetate butyrate urethane-methacrylate, with about 76% of the available hydroxyl groups of the starting cellulose ester converted to urethane-methacrylate functional groups. The calculated ethylenic unsaturation equivalent weight was 677.

EXAMPLE 8

The procedure of Example 7 was followed except that cellulose acetate propionate (CAP-504-0.2, containing 41% propionyl, 3% acetyl, 5.1% hydroxyl groups, with a falling ball viscosity of 0.2 second) was used as starting material instead of cellulose acetate butyrate.

The following materials were charged to the reaction bottle: 181.2 g (0.54 equivalent) of CAP-504-0.2 in 271.8 g methyl ethyl ketone, 53.2 g (0.34 equivalent) of isocyanatoethyl methacrylate in 79.8 g methyl ethyl ketone, 50 mg of monomethyl ether of hydroquinone and 120 mg of dibutyltin dilaurate.

After reaction and analysis, as described in Example 7, the cellulose acetate propionate urethane-methacrylate was obtained in which about 63% of the available hydroxyl groups of the starting cellulose ester had been converted to urethane-methacrylate functional groups. The calculated ethylenic unsaturation equivalent weight was 689.

EXAMPLE 9

Example 8 was repeated except that the quantities and relative amounts of reactants were as follows: 83.2 g (0.25 equiv.) of cellulose acetate propionate (CAP-504-0.2) in 124.2 g methyl ethyl ketone, 39 g (0.25 equiv.) isocyanatoethyl methacrylate in 58.5 g methyl ethyl ketone, 60 mg of monomethyl ether of hydroquinone, and 120 mg of dibutyltin dilaurate.

After reaction and analysis as described in Example 7, the cellulose acetate propionate urethane-methacrylate was obtained in which 100% of the available hydroxyl groups of the starting cellulose ester had been converted to urethane-methacrylate functional groups. The calculated ethylenic unsaturation equivalent weight was 488.

EXAMPLE 10

The procedure of Example 8 was followed except that 2-isocyanatoethyl acrylate (IEA) was used instead of isocyanatoethyl methacrylate (IEM). The preparation of isocyanatoethyl acrylate is detailed in U.S. Pat. No. 2,821,544. The purity of the isocyanatoethyl acrylate was 93% as determined by gas chromatography.

The following materials were charged to the reaction bottle: 60 g propyl acetate, 28.1 grams (0.084 equivalent based on hydroxyl) of cellulose acetate pripionate (CAP-504-0.2), 11.9 grams isocyanatoethyl acrylate (93% purity is 0.078 mole) 10 mg monoethyl ether of hydroquinone, and 2 drops dibutyltin dilaurate. After reaction and analysis as described in Example 8, the cellulose acetate propionate urethane-acrylate was obtained in which 93% of the available hydroxyl groups of the starting cellulose ester had been converted to urethane-acrylate functional groups. Based on an isocyanatoethyl acrylate purity of 93%, the calculated ethylenic unsaturation equivalent weight is 499.

In the following examples, the preparation, application, curing and evaluation of the coating compositions and formulations of this invention are described.

EXAMPLES 11–21 and Comparative Examples 1 and 2

Coating Formulation.

The unsaturated polyester oligomer products of Examples 1–5, as an approximately 60% solution in butyl acetate (BA), as obtained in their preparation, were used in all formulations.

The unsaturated cellulose ester products of Examples 6–10, as specified in Table 1 below, were used in making up the coating formulations. All were 40% solutions in methyl ethyl ketone (MEK) or propyl acetate (PA) as obtained from their preparation.

In the coating formulations of Table 1, 4 weight percent (based on reactive solids) of a photoinitiator, 1-hydroxycyclohexylphenyl ketone (Irgacure 184, Ciba-Geigy), was used.

The coating formulations were prepared by mixing the respective solutions of the polyester oligomer and the cellulose ester products, adding the photoinitiator and diluting the resulting solutions to 20% solids with butyl acetate solvent.

TABLE 1

| | Coating Formulations | | | | |
|---|---|---|---|---|---|
| | Polyunsaturated polyester, | | Polyunsaturated cellulose ester | | Solvent: BA/PA/MEK |
| Ex No. | Ex. No. | Wt. % | Ex No. | Wt. % | Wt. Ratio |
| 11 | 1 | 50 | 7 | 50 | 85/0/15 |
| 12 | 1 | 50 | 8 | 50 | 85/0/15 |
| 13 | 1 | 35 | 8 | 65 | 81/0/19 |
| 14 | 1 | 50 | 9 | 50 | 85/0/15 |
| 15 | 1 | 35 | 9 | 65 | 81/0/19 |
| 16 | 2 | 35 | 9 | 65 | 70/30/0 |
| 17 | 3 | 35 | 9 | 65 | 70/30/0 |
| 18 | 4 | 35 | 9 | 65 | 70/30/0 |
| 19 | 5 | 35 | 9 | 65 | 70/30/0 |
| 20 | 1 | 35 | 6 | 65 | 70/30/0 |
| 21 | 1 | 35 | 10 | 65 | 70/30/0 |
| Comp 1 | 1 | 100 | — | 0 | 100/0/0 |
| Comp 2 | — | 0 | 9 | 100 | 70/0/30 |

Examples 22–32 and Comparative Examples 3–6

In Examples 22–32, the coating formulations of Examples 11–21, respectively, were coated on veneered plywood panels to evaluate the coatings.

Substrate preparation:

Mahogany and maple veneer plywood panel specimens were prepared for coating using the following steps:

1. sanding the uncoated specimen with 280–350 grit sandpaper,
2. staining with a brown non-grain-raising stain,
3. applying a washcoat of a nitrocellulose-based sealer diluted 50% with butyl acetate and drying 30 minutes,
4. sanding lightly with 280–350 grit sandpaper, 5. applying a wood paste filler coat and finally drying in an oven at 55° C. for 30 minutes.
(step 5 omitted on the maple veneer panels)

The coated panel samples were tested according to the following test methods:

Sandability:

The top coated panel was dried overnight in a 50° C. oven and the sandability of the intermediate-stage uncured coating was evaluated as follows: samples were sanded by hand using a 600 grit sandpaper, wet with mineral spirits and backed by a wood block, using light to moderate pressure, and sanding in a back and forth pattern for a total of 100 strokes. Sandability was determined by inspection of the sandpaper after the above test and rated according to the following rating system:
0 = no loading (gumming) of sandpaper
1 = very slight loading
2 = slight loading
3 = moderate loading
4 = severe loading (balling, stringing)
5 = wet or tacky (not sandable)

Solvent Resistance:

Solvent resistance to acetone was determined by wetting a cotton ball with acetone, placing it on the surface of the cured top coated wood panel, covering the wetted cotton ball with a watch glass (or other cover) to retard solvent evaporation. The test panel was allowed to stand at room temperature with additional acetone added, if necessary, to maintain wetness of the cotton ball. After time periods of 10 minutes, 30 minutes, 60 minutes and each hour thereafter, if desired, and if the coating has not failed at an earlier time interval, the watch glass was removed, the wetted cotton ball lifted and the top coated wood surface inspected after any acetone on the surface had evaporated. Any change in the appearance of the coated surface when viewed at various angles is considered a failure of the coating. The time to failure is then reported.

Stain Resistance:

Stain resistance of the cured top coating on the wood panels was measured using a modification of the Test for Resistance to Surface Stains (NEMA Standard LDI-2.05). The following staining materials were used:

| Stain No. | Stain |
| --- | --- |
| 1 | 50% ethanol/50% water |
| 2 | 95% ethanol/5% water |
| 3 | 1% aqueous trisodium phosphate solution |
| 4 | conc. aqueous ammonia |
| 5 | brown shoe polish (Kiwi) |
| 6 | 10% aqueous citric acid |
| 7 | tincture of iodine, 2% (Troy) |

In this test, a staining agent is applied to the surface of the cured top coated wood panel, a cotton ball is placed on the staining agent, the cotton ball/staining agent covered with a watch glass (or other cover) and the test panel is allowed to stand at room temperature for 16 hours. At the end of this time period, the excess staining agent is completely removed, e.g., with tissue paper, and the wood surface inspected for any staining or other surface changes or blemishes. A rating system was used for each stain. Rating values of 0 to 10 were assigned as follows:
0 = no effect
5 = severe staining
10 = removed coating Heat Resistance (Wet Print Test):

Resistance of the cured top coating on the wood panels to heat was measured using a modified Boiling Water Resistance Test (NEMA Standard LD 1-2.02). In this modified test, a single layer of cheese cloth (8 cm by 8 cm) wet with water was placed on the surface of the top coated, cured, polished wood panel, and an 800 ml aluminum beaker containing 650 ml of boiling water was placed on the wet cheese cloth. After 20 minutes, the beaker and cheese cloth were removed, the wood surface was wiped dry, and inspected. Heat resistance was evaluated according to the following rating system, rating values of 0 to 5 being assigned.
0 = no effect
3 = light cheese cloth fiber print marks at edges and near center of test area
5 = cheese cloth fibers embedded in coating Abrasion Resistance:

Abrasion resistance was carried out on formulations of Table 1 coated on polyester film with a #50 wire wound rod in a single pass. Coated samples were air dried at room temperature for about 18 hours, cured with ultraviolet radiation as described for the wood top coatings. The coated film was abraded on a Taber Abraser manufactured by Gardner/Neotec Division of Pacific Scientific, using 30 cycles of a CS 17 abrasive wheel with a 500 g load. Abrasion resistance of the cured abraded coatings was determined on a Gardner Hazemeter Model No. XL-211 manufactured by Gardner/Neotec Division of Pacific Scientific, and reported as percent haze in Table 2. The lower the haze value reported, the better the abrasion resistance of the cured coating. A haze value of 15 or less represents excellent abrasion resistance.

The formulations of Table 1 were sprayed on undercoated panels prepared as described above and the sprayed panels were allowed to dry for 30 minutes. The mahogany veneer panels were lightly sanded using 480 grit paper where sandable. Then two additional topcoat layers applied to yield an approximately 3 mil (75 microns) topcoat. Panels were then tested for sandability. Sandable panels were rubbed to a gloss with Ruthlo W-6607, available from Ruthlo Sales Corp., New Albany, Ind., buffing compound followed by Ruthlo W-5040 polishing compound. Each top coated, polished wood panel was then cured by ultraviolet radiation using a Radiation Polymer Company U.V. Processor Model QC-1202 N/A by subjection to two passes on a conveyor belt, at 9.1 m/min, under two 80 watt/cm medium pressure mercury lamps set at a distance of about 8 cm above the surface of the coating. The top-coated wood panels were then evaluated for solvent and stain resistance, the results being reported in Table 2 for top-coated mahogany panels in Examples 22-26 and for maple panels in Examples 27-32. The coating formulations were coated on polyester films to evaluate the coatings for abrasion resistance.

In Comparative Examples 3 and 4, the coating formulations of Comparative Examples 1 and 2, respectively, were applied to mahogany veneer plywood panels and polyester film for evaluation.

In Comparative Example 5, a coating, as described in Example 2 of U.S. Pat. No. 3,749,592, was prepared by mixing together 100 parts ¼ second nitrocellulose, 165 parts toluol, 130 parts 2-ethoxy ethyl acetate (urethane grade), 140 parts ethyl acetate (urethane grade), and 32 parts hydroxyethyl acrylate-toluene diisocyanate adduct (1.1:1 mol ratio). To 20 g of the resulting mixture were added 0.25 g benzophenone, 15 g butyl acetate, and 2.0 g polycaprolactone triol (PCP-0300, available from Union Carbide Corp.) adducted with three molar portions of a toluene diisocyanate/hydroxyethyl acrylate monoisocyanate adduct (1:1 mol ratio). This coating was applied to mahogany veneer plywood panels and polyester film for evaluation.

In Comparative Example 6, a nitrocellulose lacquer topcoat, was coated on mahogany veneer plywood panels and polyester film for evaluation. The results are shown in Table 2.

TABLE 2

Properties of Coatings

| Ex. No. | Intermediate stage coating sandability | Cured coating properties | | | |
|---|---|---|---|---|---|
| | | Acetone resistance | Stain resistance Stain no.: 1 2 3 4 5 6 7 | Wet print | % Haze |
| 22 | 3 | >16 hrs | 0 0 0 1 0 0 0 | 0 | 9 |
| 23 | 2 | >16 hrs | 0 0 0 0 1 0 1 | 0 | 9 |
| 24 | 1 | 8-16 hrs | 0 0 0 0 0 0 2 | 0 | 11 |
| 25 | 2 | >16 hrs | 0 0 0 0 0 0 1 | 0 | 10 |
| 26 | 1 | >16 hrs | 0 0 1 0 1 0 3 | 0 | 13 |
| 27 | 3 | >6 hrs | 0 0 0 0 0 0 1 | 0 | 9 |
| 28 | 3 | >6 hrs | 0 1 0 0 0 0 0 | 0 | 9 |
| 29 | 1 | >5 hrs | 0 0 0 0 0 0 0 | 0 | 10 |
| 30 | 2 | >6 hrs | 0 0 0 0 0 0 0 | 0 | 11 |
| 31 | 3 | >6 hrs | 0 1 0 1 0 0 1 | 0 | 12 |
| 32 | 1 | >6 hrs | 0 0 0 1 0 0 1 | 0 | 9 |
| Comp 3 | 5 | >16 hrs | 0 0 0 0 0 0 0 | 0 | 5 |
| Comp 4 | 1 | 1 hr | 0 0 0 1 1 0 2 | 0 | 20 |
| Comp 5 | 3 | <1 min | 0 0 1 2 2 0 0 | 1 | 29 |
| Comp 6 | 0 | <1 min | 3 9 0 2 6 0 0 | 3 | 47 |

As can be seen from the above test results, the coatings prepared according to the invention were sandable with no more than moderate loading of the sandpaper, possessed good solvent (acetone) resistance and good stain resistance. These coatings of the invention had excellent heat resistance, with no visible effect after the wet print test, and good abrasion resistance (% haze). The coating of Comparative Example 3 showed good solvent resistance, stain resistance, heat resistance, and abrasion resistance but was not sandable. The coating of Comparative Example 4 was sandable, stain resistant and heat resistant, but showed inferior solvent resistance and abrasion resistance. The coating of Comparative Example 5 was sandable and had fair stain resistance, but was inferior in solvent resistance, heat resistance, and abrasion resistance. Comparative Example 6 was sandable, but had poor solvent resistance, stain resistance, heat resistance, and abrasion resistance.

Various modifications and alterations of this invention will become apparent to those skilled in the art without departing from the scope and spirit of this invention.

What is claimed is:

1. A coating composition comprising a curable blend of
    (a) 20 to 80 weight percent of an ethylenically unsaturated polyester comprising the condensation or addition product of a polyhydroxy polyester comprising the reaction product of at least one organic diepoxide, and at least one saturated or unsaturated dicarboxylic acid, and an effective amount of polymerizable ethylenically unsaturated compound having sufficient reactive functional groups with the hydroxyl groups of said polyhydroxy polyester oligomer to provide to the ethylenically unsaturated polyester an ethylenic unsaturation equivalent weight of less than about 500, and
    (b) 20 to 80 weight percent of ethylenically unsaturated thermoplastic polymers selected from ethylenically unsaturated cellulose esters, ethylenically unsaturated polyvinyl acetate copolymers, ethylenically unsaturated acrylic copolymers, or ethylenically unsaturated azlactone copolymers,
    said composition capable of providing a thermoplastic, soluble, sandable, intermediate-stage coating and a final stage coating which is unaffected by acetone placed on the final stage coating for 30 minutes at 22° C., which final stage coating has a percent haze value of 15% or less, and which final stage coating is unaffected when subjected to a Wet Print Test.

2. The coating composition of claim 1 wherein said ethylenically unsaturated polyester further comprises monocarboxylic acid monoepoxide, or combinations thereof.

3. The coating composition of claim 1 wherein said ethylenically unsaturated polyester is represented by the formula:

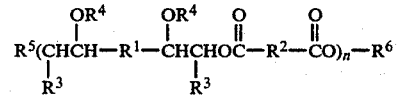

wherein
    each $R^1$ and $R^2$ are independently a divalent organic group having 2 to 40 carbon atoms selected from saturated or unsaturated straight or branched aliphatic or cycloaliphatic groups or aromatic groups;
    each $R^3$ is independently hydrogen, or an alkylene group having 2 or 3 carbon atoms that together with atoms in $R^1$ and the —CH—CH— group form a 5- or 6-membered trivalent cycloalkane group,
    each $R^4$ is independently $$-H, -\overset{O}{\underset{\|}{C}}-NH-R^7, -\overset{O}{\underset{\|}{C}}NH-R^8-O\overset{O}{\underset{\|}{C}}\underset{\underset{R}{|}}{C}=CH_2,$$

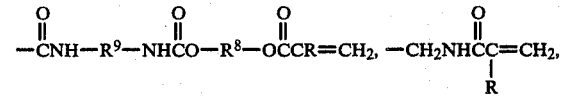

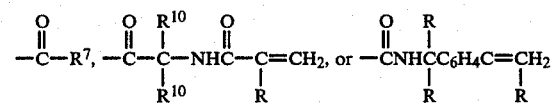

in which R is

—H or —CH$_3$; wherein $R^7$ is a monovalent organic radical having 1 to 24 carbon atoms and is selected from saturated or unsaturated straight or branched aliphatic groups or aromatic groups; $R^8$ is an alkylene group having 2 to 12 carbon atoms; $R^9$ is a divalent organic group selected from linear, branched or cyclic alkylene groups having 2 to 40 carbon atoms, phenylene groups, naphthylene groups or phenylenemethylenephenylene groups and $R^{10}$ is hydrogen or an alkyl group having 1 to 4 carbon atoms;

$R^5$ is selected from

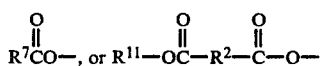

where $R^2$ and $R^7$ are as defined above and $R^{11}$ is selected from hydrogen,

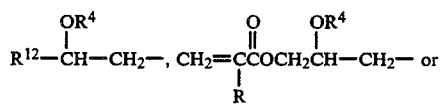

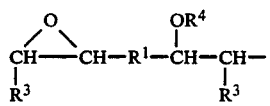

where $R^1$, $R^3$, and $R^4$ are as defined above and $R^{12}$ is a monovalent organic radical having 1 to 20 carbon atoms and is selected from saturated or unsaturated straight or branched chain aliphatic groups or aromatic groups;

$R^6$ is selected from $R^{11}$ or

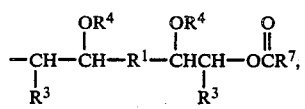

where $R^1$, $R^3$, $R^4$, $R^7$ and $R^{11}$ are as defined above; and n is a number having an average value of about 1 to 10, except where $R^5$ is

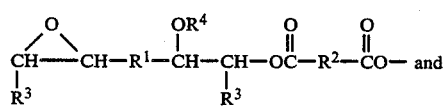

$R^6$ is selected from hydrogen,

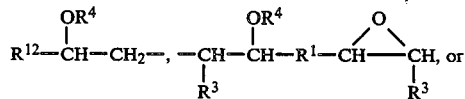

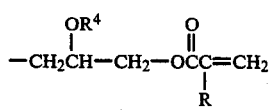

n is a number having an average value of about 0 to 10.

4. An ethylenically unsaturated polyester according to claim 3 wherein said divalent organic group $R^9$ is substituted by up to four lower alkyl groups having 1 to 4 carbon atoms.

5. An ethylenically unsaturated polyester according to claim 3 represented by the formula

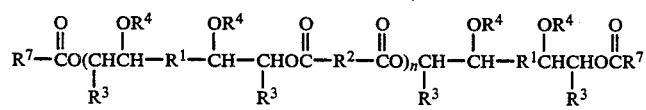

6. An ethylenically unsaturated polyester according to claim 5 wherein each of $R^2$, $R^4$ and $R^7$ contain a polymerizable ethylenically unsaturated group.

7. The coating composition of claim 1 wherein said ethylenically unsaturated thermoplastic cellulose ester comprises the condensation or addition product of (a) a cellulose ester of cellulose and saturated aliphatic monocarboxylic acids having 2 and 4 carbon atoms or aromatic monocarboxylic acids, said cellulose ester having an average of 0.1 to 2.0 unreacted hydroxyl groups per anhydroglucose unit and (b) a chemically effective amount of polymerizable ethylenically unsaturated compound having sufficient reactive functionality with the hydroxyl groups of said cellulose ester, to yield an ethylenically unsaturated cellulose ester wherein up to 100% of the unreacted hydroxyl groups have been converted to polymerizable unsaturated groups.

8. The polymerizable ethylenically unsaturated cellulose esters according to claim 7 represented by the following formula:

$$[C_6H_7O_2(OR^{13})_x(OR^{14})_{3-x}]_m$$

wherein each $R^{13}$ is independently selected from H,

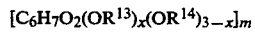

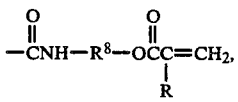

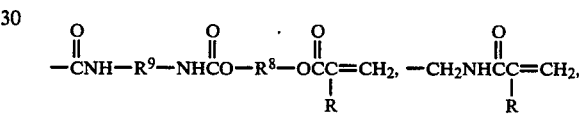

where R, $R^8$, $R^9$ and $R^{10}$ are as defined above; $R^{14}$ is selected from

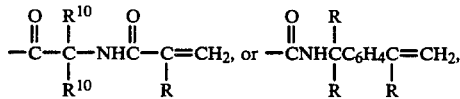

where $R^7$ is as defined above, x is 0.1 to 2.0; m is a number of at least about 20 or larger, and the various $OR^{13}$ and $OR^{14}$ groups are randomly distributed in the m subunits, and have an unsaturated equivalent weight of less than about 1000.

9. A polymerizable ethylenically unsaturated cellulose ester according to claim 8 having the formula

where $R^{15}$ is independently selected from $-C_2H_5$ or $-C_3H_7$, the sum of a and b is $3-x$, each of a and b are 0 to 2.9 and the a, b and x groups are randomly distributed in the m subunits of the cellulose ester.

10. A wood substrate having a protective coating thereon comprising a cured coating of the composition of claim 1.

11. A method for protectively coating a substrate comprising the steps of
  (a) coating said substrate with the composition of claim 1, and
  (b) drying said coating,
  (c) curing said coating.

12. The method of claim 11, wherein said coating is sanded after said drying step, prior to said curing step.

13. A coating composition comprising a blend of (a) 20 to 80 weight percent of ethylenically unsaturated polyester which is the condensation or addition product of a polyhydroxy polyester comprising the reaction product of at least one organic diepoxide, and at least one saturated or unsaturated dicarboxylic acid, and an effective amount of polymerizable ethylenically unsaturated compound having sufficient reactive functional groups with the hydroxyl groups of said polyhydroxy polyester oligomer to provide to the ethylenically unsaturated polyester an ethylenic unsaturation equivalent weight of less than about 500, and (b) 20 to 80 weight percent of an ethylenically unsaturated thermoplastic cellulose ester which is the condensation or addition product of a cellulose ester of cellulose and saturated aliphatic monocarboxylic acids having 2 to 4 carbon atoms or aromatic monocarboxylic acids, said cellulose ester having an average of 0.1 to 2.0 unreacted hydroxyl groups per anhydroglucose unit and a chemically effective amount of polymerizable ethylenically unsaturated compound having sufficient reactive functionality with the hydroxyl groups of said cellulose ester, to yield an ethylenically unsaturated cellulose ester wherein up to 100% of the unreacted hydroxyl groups have been converted to polymerizable unsaturated groups.

14. A coating composition comprising a blend of (a) 20 to 80 weight percent of an ethylenically unsaturated polyester which is the addition product of (i) a polyhydroxyl polyester comprising the reaction product of the diglycidyl ether of Bisphenol A, itaconic acid, and acrylic acid, the molar ratio being 1.0/0.5/1.0, respectively, and (ii) isocyanatoethyl methacrylate and (b) 20 to 80 weight percent of an ethylenically unsaturated thermoplastic polymer which is the addition product of cellulose acetate propionate and isocyanatoethyl methacrylate.

15. A coating composition comprising a curable blend of
  (a) 20 to 80 weight percent of an ethylenically unsaturated polyester comprising the condensation or addition product of a polyhydroxy polyester comprising the reaction product of at least one organic diepoxide, and at least one saturated or unsaturated dicarboxylic acid, and an effective amount of polymerizable ethylenically unsaturated compound having sufficient reactive functional groups with the hydroxyl groups of said polyhydroxy polyester oligomer to provide to the ethylenically unsaturated polyester an ethylenic unsaturation equivalent weight of less than about 500, and
  (b) 20 to 80 weight percent of an ethylenically unsaturated cellulose ester comprising the reaction product of a cellulose ester of cellulose and saturated aliphatic monocarboxylic acids having 2 to 4 carbon atoms or aromatic monocarboxylic acids, said cellulose ester having an average of about 0.1 to 2.0 unreacted hydroxyl groups per anhydroglucose unit, and a polymerizable ethylenically unsaturated compound having an isocyanato group reactive with the hydroxyl groups of the cellulose ester, said composition capable of providing a thermoplastic, soluble, sandable, intermediate-stage coating and a final stage coating which is unaffected by acetone placed on the final stage coating for 30 minutes at 22° C., which final stage coating has a percent haze value of 15% or less, and which final stage coating is unaffected when subjected to a Wet Print Test.

* * * * *

UNITED STATES PATENT AND TRADEMARK OFFICE
CERTIFICATE OF CORRECTION

PATENT NO. : 4,654,233

DATED : March 31, 1987

INVENTOR(S) : Richard J. Grant, Gilbert C. Johnson and Heather V. Landin

It is certified that error appears in the above-identified patent and that said Letters Patent is hereby corrected as shown below:

Col. 8, line 11, "ERL$^{TM}$-4026" should be -- ERL$^{TM}$-4206 -- .

Col. 11, line 45, insert -- where -- before $R^7$ .

Signed and Sealed this

Seventeenth Day of May, 1988

Attest:

DONALD J. QUIGG

*Attesting Officer*  *Commissioner of Patents and Trademarks*